United States Patent [19]

Diekhans et al.

[11] Patent Number: 5,715,665
[45] Date of Patent: Feb. 10, 1998

[54] LOCATING DEVICE FOR AN AUTOMATIC STEERING SYSTEM OF AN AGRICULTURAL VEHICLE

[75] Inventors: Norbert Diekhans, Guetersloh; Ludger Autermann, Drensteinfurt; Stefan Hagedorn, Warendorf; Helmut Homburg, Harsewinkel, all of Germany

[73] Assignee: Claas Kommanditgesellschaft Auf Aktien, Harsewinkel, Germany

[21] Appl. No.: 612,568

[22] Filed: Mar. 8, 1996

[30] Foreign Application Priority Data

Mar. 13, 1995 [DE] Germany ............... 195 08 941.3

[51] Int. Cl.⁶ ........................................... G06F 165/00
[52] U.S. Cl. ...................... 56/10.2 F; 172/4.5; 364/460
[58] Field of Search ........................... 37/343; 56/10.2 F, 56/28, 30, DIG. 15, 10.2 D; 172/2, 4, 4.5, 7; 180/168, 131, 401, 23, 415; 364/424.07, 424.022

[56] References Cited

U.S. PATENT DOCUMENTS

| 4,219,093 | 8/1980 | Lang | 180/131 |
|---|---|---|---|
| 4,372,407 | 2/1983 | McColl | 180/23 X |
| 4,967,362 | 10/1990 | Schutten et al. | 364/424.07 |
| 5,019,983 | 5/1991 | Schutten et al. | 56/102 F X |
| 5,100,229 | 3/1992 | Lundberg et al. | 172/4.5 X |
| 5,477,459 | 12/1995 | Clegg et al. | 364/424.07 X |

FOREIGN PATENT DOCUMENTS 2109744  3/1971  Germany.
2455836  11/1974  Germany.

*Primary Examiner*—Terry Lee Melius
*Assistant Examiner*—Robert Pezzuto
*Attorney, Agent, or Firm*—Michael J. Striker

[57] ABSTRACT

The locating device for an agricultural machine controlled by an automatic steering system includes a first locating device component (OV1) directed at a first portion of a field on which agricultural material is not present, but adjacent an edge (GK) of the agricultural material and producing a first locating signal (OS1), a second locating device component (OV2) directed at a second portion of the field containing the material and adjacent, but not including, the edge of it and producing a second locating signal (OS2), a third locating device component (OV3) directed at a third portion of the field including the edge of the material and producing a third locating signal (OS3), a device for transmitting the first, second and third locating signals (OS1, OS2, OS3) to a regulating device (ST) for generating at least one hydraulic steering signal (SHL,SHR) from a standardized locating signal (NOS) to control the steerable wheels (HR) according to a predetermined locating criterion and a device for generating the standardized locating signal (NOS) by determining a preset range parameter from the first and second locating signals (OS1,OS2), determining a null point value as an average value of the first and second locating signals (OS1,OS2) and deriving the standardized locating signal (NOS) from the third locating signal (OS3) and the null point value.

19 Claims, 2 Drawing Sheets

LOCATING DEVICE FOR AN AUTOMATIC STEERING SYSTEM OF AN AGRICULTURAL VEHICLE

BACKGROUND OF THE INVENTION

The present invention relates to a locating device, especially to a locating device of an automatic steering system which guides an agricultural machine, especially a harvesting machine, travelling through a field along an edge of an agricultural material grown in the field.

Locating devices of this type are known whose position signals are fed to a control device, which provides at least one hydraulic steering signal to an electrically controlled hydraulic steering system for the drive wheels of an agricultural machine, particularly a harvesting machine for grain and the like crops. The drive wheels are controlled so that a position signal deviation from a set value is minimized according to a predetermined locating criterion, particularly a predetermined lateral spacing of an edge of the agricultural material, e.g. the standing grain in a field, from a lateral edge of the agricultural machine.

A device of this kind is known and described in German Published Patent Application DE-A-21 09 744. This device comprises a light emitting system on a harvesting machine near the harvesting or cutting mechanism, which travels through a grainfield near the edge of the standing grain to harvest the grain, which is provided with photocells positioned on both sides of the harvesting machine whose sensor signals act on an associated control relay, whose inverse acting control contacts act on the right and/or left controlling hydraulic valve of steering system for the rear wheels of the harvesting machine. This device has the disadvantage that density of the harvested materials enters directly into the accuracy of the control, since an apparent lateral shift of the harvesting machine mechanism relative to the edge of the material being harvested, e.g. the standing grain, depends on the density. Furthermore a deviation of the travel direction from the course of the edge of the material being harvested is not detected, which forms the basis for the control action.

Furthermore a locating device for steering of a harvesting machine is described in German Published Patent Application DE- C-24 55 836, which has a transmitter and receiver, which are arranged on the front of the harvester mechanism and are aligned at an acute angle laterally to the standing grain. The receiver amplitude signal is compared to a predetermined set value for control of the drive. To reduce the effects of noise narrow-band light emitters, polarizers and modulators or shortwave, narrow-band electromagnetic radiation and periodic horizontal oscillations can be used in addition to appropriate signal analyzer means. The disadvantage here is that oscillating properties, particularly a fluctuating density, of the standing grain, can strongly effect the steering of the vehicle, because of that, is driven or guided poorly or weakly.

SUMMARY OF THE INVENTION

It is an object of the present invention to provide a locating device of an automatic steering system for an agricultural machine of the above-described kind, which automatically keeps the agricultural machine in a predetermined spatial relationship, especially at a predetermined distance, to the edge of the material in the field through which the agricultural machine is travelling, and provides a more accurate steering of the machine, especially a harvesting machine, which harvests a material such as grain.

According to the invention, the locating device of an automatic steering system in an agricultural machine having steerable wheels controlled by the automatic steering system to drive the agricultural machine through a field having an agricultural material comprises a first locating device component directed at a portion of the field on which the agricultural material is not present, but adjacent an edge of the agricultural material and includes means for producing a first locating signal, a second locating device component directed at a portion of the material adjacent the edge of the material but not including the edge of the material and including means for producing a second locating signal, a third locating device component directed at a portion of the material including the edge of the material and including means for producing a third locating signal, means for transmitting the first, second and third regulating signals from the locating device components to a regulating device for generating at least one hydraulic steering signal from a standardized locating signal for control of an electrically controllable hydraulic steering device for controlling the steerable wheels according to a predetermined locating criterion. The locating device also includes a device for generating the standardized locating signal by determining a preset range parameter as a difference between the first locating signal and the second locating signal, determining an average value of the first locating signal and the second locating signal to obtain a null point value for the third locating signal and deriving the standardized locating signal from the third locating signal and the null point value by standardizing with the preset range parameter.

In a preferred embodiment of the locating device according to the invention for a harvesting machine for grain it has proven particularly advantageous to arrange the three locating device components so that they view the stubble field next to the grain, a portion of the grain not including the edge of the standing grain and a portion of the grain including the edge of the standing grain so that the first and second locating signals define the preset range parameter. The intermediate sized signal from the third locating device component is within this range and is standardized in further processing to provide the standardized locating signal. The locating devices can advantageously include means for analyzing optical signals, especially infrared or monochromatic light signals, and acoustic signals, especially reflected acoustic signals.

Advantageously the locally detected portions of the stubble field and the grain field lie so far in front of the harvesting machine that the compensation effect available by virtue of the standardized locating signal formed from the three individual locating signals has only a weak dependence on the unevenness of the ground, particularly the roll of the ground, and on the dipping and tipping motions of the agricultural machine or on the harvesting or cutting mechanism design.

The locating device which detects the edge of the standing grain is advantageously equipped so that it detects a region which is several meters in front of the harvesting mechanism of the harvesting machine, since the harvesting machine is driven at its rear wheels on the other side of the harvesting mechanism and thus a deviation from the provided travel can only be balanced after a correspondingly larger reverse travel.

In preferred embodiments it has proven particularly advantageous to feed the actual signal of a rear wheel angular position as an additional input parameter into the regulating means so that the corrected path of the harvesting machine can be derived from this signal. It has also proven advantageous to set up and store an addressable two-dimensional characteristic data field of drive steering parameters which is addressable by a digitized standardized locating signal and rear wheel angular position signal to obtain particular values of the drive steering parameter. This characteristic data field of steering parameters can be later optimized to provide an optimum steering and can be easily adjusted for special conditions.

It has been shown that approximately 60% of the attentiveness of the driver of the agricultural machine must be devoted to steering the machine. The steering of the machine is thus especially difficult since steering with the rear wheels requires a comparatively long aim-maintaining time until a lateral position change of the harvesting machine to the grain edge occurs and, after that, the machine must be guided back to the correct path of travel again by a corresponding reverse controlling adjustment. The automatic steering provided by the steering system with the locating device according to the invention allows a more rapid travel of the agricultural machine with a practically complete easing of the burden of steering on the driver and a nearly complete loading cutting mechanism width up to a guaranteed residual spacing of about 10 cm.

The locating device components are advantageously infrared sensors, but also ultrasonic sensors or light spot transmitting and receiver devices may be used. The locating sensors may be provided with focussing means, which observe a solid angle including 50% of the signal whose half width is 6° or a solid angle including 90% of the signal whose half width is 12°. The locating device components are advantageously above the harvesting mechanism at a height of 1.5 m from the ground. The first locating device component advantageously is oriented to observe a portion of the field without the material whose center is about 1.5 m from the edge of the material. The second locating device component is correspondingly directed to observe a portion of the material to be harvested whose center is located about 1.5m from the edge of the material to be harvested, e.g. particularly the grain. This solid angle of observation particularly results in a detected portion or area of about 1 m in diameter on the ground and the solid angles of observation are spaced from each other about half the same diameter from each other. When infrared sensors are used in the locating device components it has proven advantageous to detect and analyze a wavelength band between 8 and 14 micrometers by means of a filter with a diaphragm. These infrared sensors can comprise cascaded planar thin layer thermocouple elements and an infrared lens arranged to focus the infrared radiation on the thermocouple elements. The thin film contact arrangements are advantageously formed sector-shaped and blackened on one of their contacting terminals while having a reflecting coating on the other to protect against the radiation.

Protracted experiments have shown that the temperature difference between harvested regions of a field and the standing grain are between 10° C. and 1° C., the standing grain being somewhat warmer than the harvested field portion. The absolute temperature of the ground is between 45° C. and 20° C. depending on the type of ground. The computation of the temperature difference allows a meaningful evaluation of the signals of the third sensor. Because the absolute value of the difference and a strong correlation of both related sensor signals to the upper and/or lower detected regions are independent of whether the grain or the stubble has a higher temperature the steering signals for the control are correctly produced. The agricultural machine is driven in a straight line when a very unusual temperature difference occurs which is too small and then a suitable signal is given to the operator of the machine. The ground temperature is stable for a few minutes after the harvesting process so that the temperature difference between the standing grain and the ground is maintained during the further travels of the harvesting machine.

A light source which produces light at a wavelength which provides a comparatively high contrast between the illuminated standing grain which is substantially yellow and the largely brown stubble field is advantageously used in the light spot sensors. Accordingly light receivers of a suitable frequency are provided so that the influence of stray light from the surroundings is minimized as much as possible. A sodium vapor lamp has proven especially advantageous as a light source. Furthermore in this embodiment it is advantageous to modulate the light from the light source to vary the light intensity and to use an electrical filter for the receiver of an appropriate band or frequency pass in the electrical signal processing equipment.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
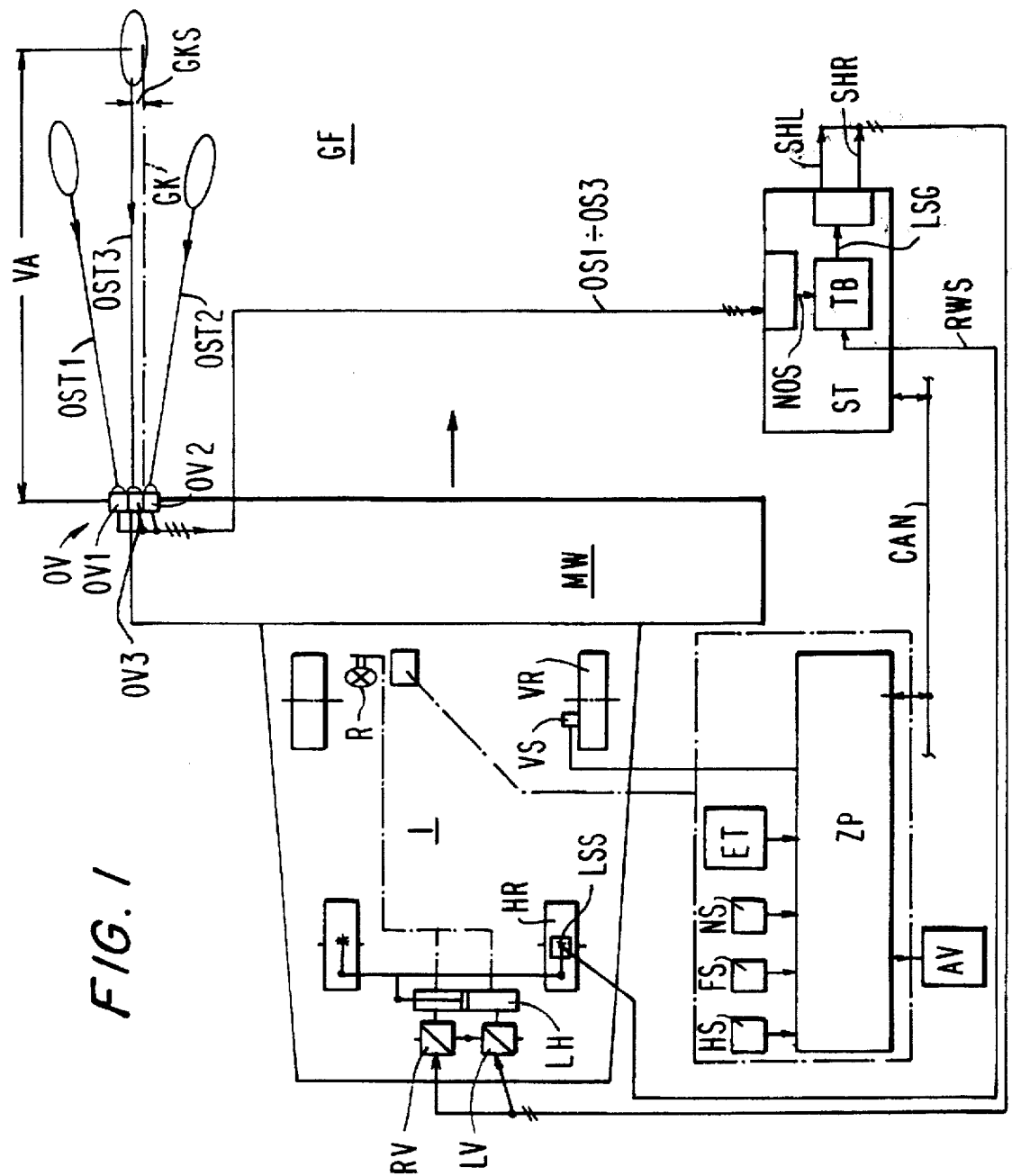
FIG. 1 is a diagrammatic top view of a harvesting machine with an automatic steering system including the locating device according to the invention.

FIG. 1 shows a harvesting machine 1 with a harvesting mechanism MW which should travel in a direction FR automatically along a grain edge GK of a grainfield GF with as small a deviation as possible from a predetermined lateral distance GKS from the grain edge GK. A locating device OV is positioned about 1.5 m above the harvesting mechanism MW, and it comprises three locating device components OV1, OV2, OV3, whose locating beams OST1, OST2, OST3 are directed on the stubble field, the grainfield GF and the grain edge GK respectively, and whose respective locating signals OS1, OS2, OS3 are transmitted to a regulating device ST. These locating signals are appropriately digitized and converted into a standardized locating signal NOS. The difference between both locating signals OS1, OS2 of both outside locating beams OST1, OST2 is formed and a preset range parameter is associated with it. Furthermore the average value of these reference locating signals OS1, OS2 is formed, which acts as a reference value or null point value of the locating signal OS3 of the third central locating beam OST3, which is directed at the grain edge GK.

In the embodiment shown in FIG. 1 the regulating device ST is connected via a standard data bus CAN with a central processor ZP, by which the remaining control processes of the harvesting machine 1 are monitored and controlled. An input device ET and an output device AV are also provided for the central processor ZP. Furthermore the central processor ZP receives a speed signal VS from the front wheels VR. The hydraulic steering device LH is controlled by the regulating device ST which controls a left control valve LV and a right control valve RV, whose hydraulic outflows act on the hydraulic steering device LH which, in turn, acts on the rear wheels HR. A wheel angular position signal RWS is read by the steering system and input to the regulating device ST. The left and right control valves LV, RV are spring-loaded so that they are reliably automatically closed if there is a failure of the hydraulic steering device. In this state the steering is provided directly by the driver's wheel in the operator's cabin via the known hydraulic steering system. A manual switch HS, a foot switch FS and a safety switch NS are also provided in the operator's cabin, whose signals are fed to the steering system valve apparatus for safety reasons and are available for the regulating device ST on its activation on forming these signals.

The forward distance VA of the locating beam OST3 which detects the grain edge GK corresponds approximately to the distance of the front wheels VR from the rear wheels HR. In this way an angular deviation of the harvesting machine axle toward the grain edge, which manifests itself as a partial signal, produces equivalent control signal components in the wheel angular position signal. These angular orientation components in the locating signal beam overlap or are superimposed on the signal components for lateral displacement of the axle of the harvesting machine from its predetermined set value, i.e. the signal components which include information regarding the lateral distance GKS of the harvesting machine from the grain edge.

The locating device OV according to the invention advantageously transmits its standardized locating signal NOS which is already digitized into the regulating device ST. The other sensors which produce the remaining input variables generally are distributed in the harvesting machine and pass along their signals via the associated digitizer and processor. Understandably the standardizing devices can be provided directly in the pertinent locating beam components.

A drive wheel position sensor LSS, whose wheel angular position signal RWS is used in an appropriate manner as an additionally input control signal, is mounted at the driven rear wheels HR. It has proven particularly advantageous to address a stored two-dimensional data field TB of suitable drive steering parameters LSG with the standardized position signal NOS and the wheel angular position signal RWS. The drive steering parameter LSG obtained by the addressing is converted into a left and/or right hydraulic steering signal SHL,SHR and fed to the left and/or right control valve LV,RV.

Figure 2:
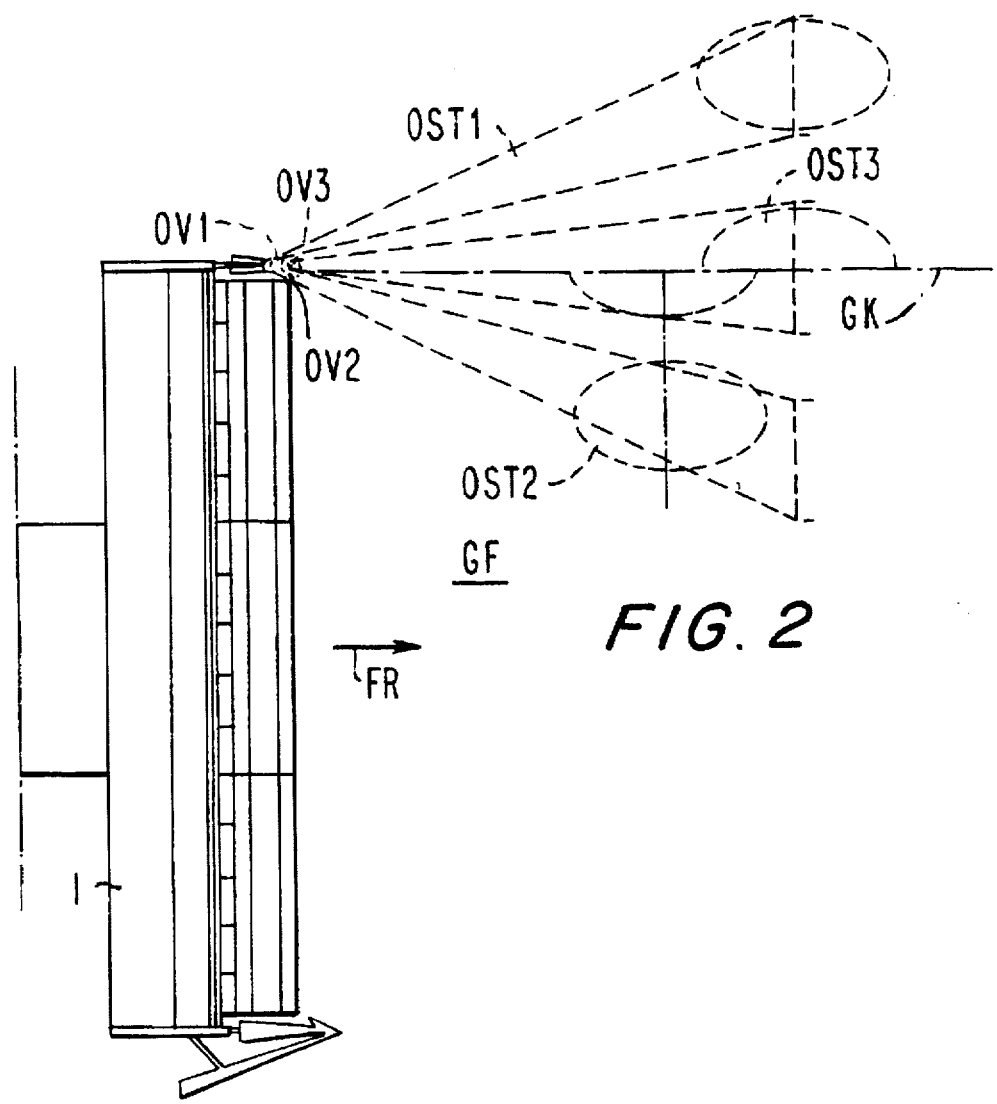
FIG. 2 is a top plan view of the locating device according to the invention for detecting an edge of standing grain to be harvested.

The embodiments of the locating device components as shown in FIG. 2 which have proven particularly satisfactory use ultrasonic and infrared detection means. The locating device OV according to the invention with the three locating device components OV1, OV2, OV3 is mounted on the cutting or harvesting mechanism MW of the harvesting machine 1 so that they can be located near the grain edge GK. The first locating device component OV1 detects the already harvested portion of the field, the second locating device component OV2 is pointed at the grainfield but not the edge GK and the third or central locating device component OV3 detects the standing grain GF including the grain edge GK and a portion of the field from which the grain has been harvested. The three locating device components OV1, OV2, OV3 for an optical locating system may be provided by a scanning strip sensor, respective sections of which are focussed on the three field regions by a suitable focussing system. Both signals of the outer locating beams OST1, OST2 are used as reference signals for the upper and lower limits of the signal of the central locating beam OST3, so that a uniform sensitivity is always guaranteed in spite of the differences of fluctuating input signals.

Figure 3:
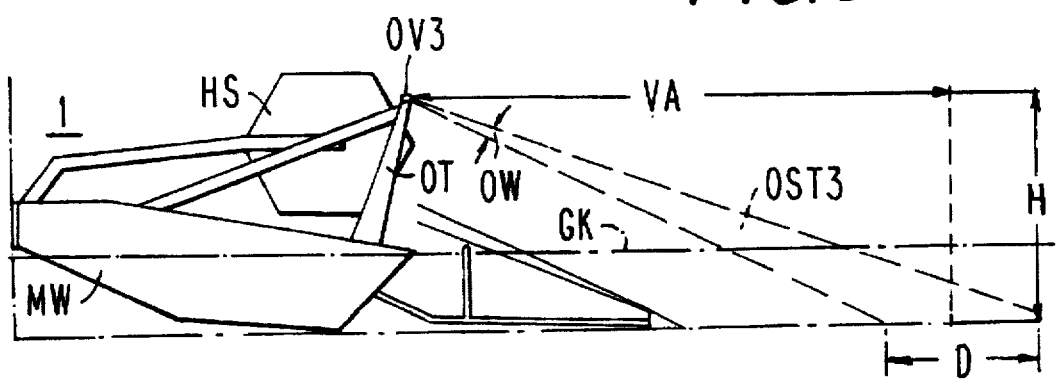
FIG. 3 is a diagrammatic side elevational view of the apparatus shown in FIG. 2 at the edge of the grain to be harvested.

FIG. 3 shows the harvesting mechanism MW of the harvesting machine 1 in the vicinity of the grain edge GK and the locating beam OST3. The associated locating device component OV3 is arranged together with the remaining locating device components on a support OT at a height H of about 1.5 m above the ground in front of the harvesting mechanism. The locating beam OST3 is directed partly to the ground inclined to the ground and partly to the grain edge GK so that it detects the ground at about a forward spacing VA of 3 to 4 m. The beam spreading angle or solid observation angle OW of the locating component amounts to about 6° when the angle includes 50% of the signal intensity and about 12° when the angle includes 90% of signal intensity. The locating beam spot on the ground has a diameter D of about 1 m.

The structure of the regulating device allows the complete integration of the steering system based on the locating device with the remaining digital control of the harvesting machine in the digital processor. The parameters are transmitted to the processor by a simple parameterization and by operation of the central operator's console of the harvesting machine; the regulating device itself is completely neutral in its basic structure. The most different locating systems may be joined or connected by simple parameterizations and standardization of the signals and no special hardware is required for the regulating device.

While the invention has been illustrated and described as embodied in a locating device, especially of a steering system of a harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Locating device of an automatic steering system in an agricultural machine having steerable wheels controlled by said automatic steering system to drive the agricultural machine through a field having an agricultural material thereon, said locating device (OV) comprising a first locating device component (OV1) directed at a first portion of said field on which said agricultural material is not present, but adjacent an edge (GK) of said agricultural material in said field and including means for producing a first locating signal (OS1), a second locating device component (OV2) directed at a second portion of said field on which said agricultural material is present adjacent, but not including, said edge (GK) of said material and including means for producing a second locating signal (OS2), a third locating device component (OV3) directed at a third portion of said field including said edge (GK) of said material and including means for producing a third locating signal (OS3), means for transmitting said first, second and third locating signals (OS1,OS2, OS3) from said locating device components to a regulating means (ST) for generating at least one hydraulic steering signal (SHL,SHR) for control of an electronically controllable hydraulic steering device (LH) for the steerable wheels (HR) from a standardized locating signal (NOS) to guide said agricultural machine (1) along said edge according to a predetermined locating criterion and means for generating said standardized locating signal (NOS);

wherein said means for generating said standarized locating signal (NOS) comprises means for determining a preset range parameter as a difference between said first locating signal (OS1) and said second locating signal (OS2), means for determining an average value of said first locating signal (OS1) and said second locating signal (OS2) to obtain a null point value for said third locating signal (OS3) and means for deriving said standarized locating signal (NOS) from said third locating signal (OS3) and said null point value by standardizing with the preset range parameter.

2. The locating device as defined in claim 1, wherein said agricultural machine (1) is a harvesting machine, said material is grain to be harvested by said harvesting machine and said portion of said field on which said material is not present is a stubble field from which said grain has been harvested.

3. The locating device as defined in claim 2, wherein said predetermined locating criterion is a lateral spacing (GKS) of said edge (GK) of said grain from a harvesting machine edge of said harvesting machine.

4. The locating device as defined in claim 1, wherein said first, second and third locating device components (OV1, OV2, OV3) comprise an optical scanning strip sensor and focussing means for focussing on respective sections of said optical scanning strip sensor said first, second and third portions of said field.

5. The locating device as defined in claim 1, wherein said portions detected by said locating device components (OV1, OV2, OV3) are spaced a predetermined forward distance (VA) from said agricultural machine (1) so that locating signal deviations from a comparison value determined by said predetermined locating criterion partially represent deviations from a lateral spacing (GKS) of said edge (GK) of said material from an edge of said agricultural machine and partially represent deviations of an angle of travel of said agricultural machine (1) with respect to said edge (GK) of said material from a set value of said angle of travel.

6. The locating device as defined in claim 5, wherein said agricultural machine has front wheels (VR) and said forward distance (VA) corresponds approximately to a spacing between said steerable wheels (HR) and said front wheels (VR) of said agricultural machine (1), and wherein said regulating means (ST) includes means for generating an angular wheel position signal (RWS) characteristic of an angular wheel position of said steerable wheels (RH) as an additional actual value signal.

7. The locating device as defined in claim 6, further comprising means for storing an addressable two-dimensional characteristic data field (TB) of drive steering parameters (LSG), means for addressing said characteristic data field (TB) with said standardized locating signal (NOS) and said angular wheel position signal (RWS) to obtain a particular value of said drive steering parameters (LSG) associated therewith and means for generating said at least one hydraulic steering signal (SHL,SHR) from said particular value of said drive steering parameters.

8. The locating device as defined in claim 1, wherein each of said locating device components (OV1, OV2, OV3) observe a solid angle having a half width of about 6°.

9. The locating device as defined in claim 1, wherein said agricultural machine (1) has a harvesting mechanism (MW) and a side positioned adjacent said edge of said material during travel of the agricultural machine (1) through the field, each of said locating device components (OV1, OV2, OV3) is mounted above the harvesting mechanism (MW) on said agricultural machine at said side adjacent said edge of said material and at a height of about 1.5 m above ground in said field.

10. The locating device as defined in claim 1, wherein said first locating device component (OV1) is orientable so that a center of said first portion of said field which is detected by said first locating device component (OV1) is about 1.5 m from said edge of said material.

11. The locating device as defined in claim 1, wherein said second locating device component (OV2) is orientable so that a center of said second portion of said field detected by said second locating device component (OV2) is about 1.5 m from said edge of said material.

12. The locating device as defined in claim 1, wherein each of said locating device components (OV1,OV2,OV3) comprises an ultrasonic transmitting means and receiving means.

13. The locating device as defined in claim 1, wherein each of said locating device components (OV1,OV2,OV3) comprises a microwave transmitting and receiving means.

14. The locating device as defined in claim 1, wherein each of said locating device components (OV1,OV2,OV3) comprises a light spot transmitting and receiving means.

15. The locating device as defined in claim 1, wherein each of said locating device components (OV1,OV2,OV3) is an infrared sensor device.

16. The locating device as defined in claim 15, wherein said infrared sensor device includes means for receiving infrared radiation having wavelengths between 8 and 14 micrometers.

17. The locating device as defined in claim 16, wherein said infrared sensor device comprises a plurality of cascaded, planar thin layer thermocouple elements and an infrared lens arranged to focus said infrared radiation on said thermocouple elements.

18. The locating device as defined in claim 1, wherein said locating device components (OV1,OV2,OV3) comprises means for generating and modulating at least one beam of light having at least one wavelength selected to provide contrast between said material and said portion of said field not containing said material, and an optical sensor and analyzer means for said light having an electronic filter means for producing demodulated, filtered electronic sensor signals from said light.

19. The locating device as defined in claim 18, wherein said means for generating and modulating said at least one beam of light comprises a sodium vapor lamp.

* * * * *